Dec. 28, 1948.          R. F. HALE          2,457,367
AXIALLY ENGAGING FRICTION CLUTCH
Filed Oct. 13, 1943
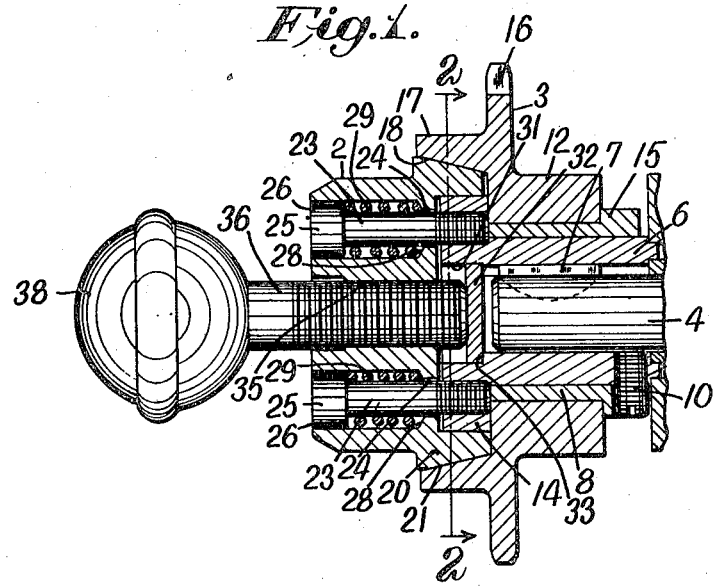
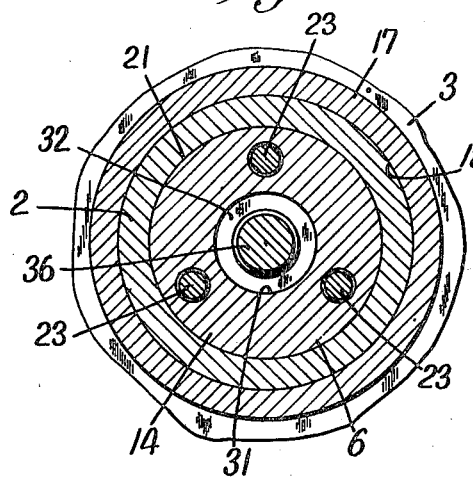
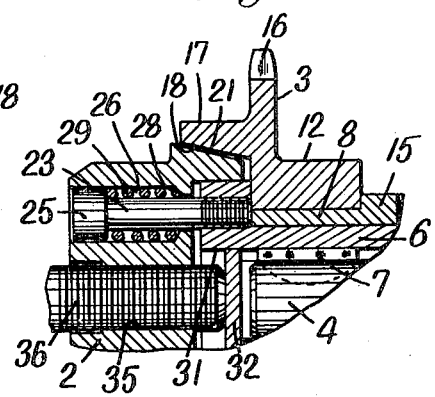
Inventor:
Ralph F. Hale.
by
Louis B. Maxon
Atty.

Patented Dec. 28, 1948

2,457,367

UNITED STATES PATENT OFFICE 2,457,367

AXIALLY ENGAGING FRICTION CLUTCH

Ralph F. Hale, Claremont, N. H., assignor to Joy Manufacturing Company, a corporation of Pennsylvania Application October 13, 1943, Serial No. 506,113

13 Claims. (Cl. 192—66)

My invention relates to clutch mechanisms, and more particularly to means for controlling the operation of a clutch member.

The clutch mechanism of my invention desirably includes, in a preferred embodiment, a clutch member connected to rotate with a driven member and movable axially relative to the latter to control a connection with a driving member, means being provided for yieldingly urging the clutch member toward the driving member, and a member having a relatively adjustable connection, shown hereinafter as a threaded engagement, with the clutch member being operable to effect a connection or a release of the latter. The functions of the driving and driven members may be reversed and other changes made, however, without departing from the spirit of the invention or the scope of the appended claims.

An object of the invention is to provide an improved clutch mechanism. Another object of the invention is to provide improved controlling means for a clutch member. Still another object is to provide an improved clutch mechanism having a clutch member yieldingly urged toward a clutch applying position, and improved manually controlled means for adjusting the position of the clutch member. Yet another object is to provide an improved clutch mechanism including a clutch member yieldingly held in position for connecting a driven member to a driving member, and having a control member normally rotating with the clutch member and adapted to be held against rotation while the clutch member rotates for effecting a release of the latter from the driving member. Other objects and advantages of the invention will hereinafter more fully appear.

In the accompanying drawing, in which for purposes of illustration one form which my invention may assume in practice is disclosed:

Fig. 1 is a longitudinal sectional view through my improved clutch mechanism.

Fig. 2 is a cross sectional view taken on line 2—2 of Fig. 1.

Fig. 3 is a fragmentary sectional view taken on the plane of Fig. 1 and showing the clutch member in a different position.

In the illustrative embodiment of my invention there is shown a clutch member 2 adapted to connect a driving member 3 in driving relation with a member 4, shown herein as a shaft, to be driven. Surrounding the end portion of the shaft is a sleeve member 6 held against rotation relative to the shaft, as by a key 7. Mounted on the sleeve member 6 is a bushing 8, and a set screw 10 extending through openings in the bushing and the sleeve member into engagement with the shaft 4, holds the sleeve member and the bushing against movement relative to the shaft.

The driving member 3 is provided with a hub portion 12 rotatably mounted on the bushing 8, and is held against movement axially of the shaft by flange portions 14 and 15 formed respectively on the sleeve member 6 and the bushing at opposite ends of the hub portion. Any suitable means may be provided for rotating the driving member. As shown herein, sprocket teeth 16 are formed on the driving member, and a sprocket chain, not shown, is adapted to engage the sprocket teeth for rotating the member 3. Projecting from the forward end of the driving member is a flange portion 17 having a friction clutch surface 18 conforming to the surface of a cone.

The clutch member 2 is herein a clutch operating element and is provided with a cone shaped portion 20 at its end adjacent the driving member, and this portion has a friction clutch surface 21 adapted to engage the surface 18 on the driving member. Threaded into openings in the flange portion 14 of the sleeve member 6 are bolts 23 extending through openings 24 in the clutch member 2 and having heads 25 fitting within enlarged openings 26 in the clutch member. Arranged between the heads 25 and shoulders 28 at the inner ends of the enlarged openings 26 are springs 29 for yieldingly urging the clutch member toward the driving member to apply the clutch.

Formed in the sleeve member 6 beyond the end of the shaft 4 is an enlarged bore 31, and an abutment plate 32 fits tightly within this bore and in engagement with a shoulder 33 at the inner end of the bore. Extending through the clutch member 2 in axial alinement with the shaft 4 is an opening 35 within which a control rod 36 is threaded. The inner end of the control rod is adapted to engage the abutment plate 32, and the outer end of the rod is provided with a handle or grasping portion 38 by means of which the operator may either cause the control rod to rotate relative to the clutch member 2, or vice versa, for effecting axial movement of the latter, or may cause an outward bodily movement of the control rod moving the clutch member with it away from the driving member. The threaded engagement between the control rod and the clutch member is such that on rotation of the clutch member relative to the control rod in the direction in which the driving member is rotating, the clutch member will be moved axially away from the driving member.

When the friction surface 21 on the clutch member 2 is moved into engagement with the friction surface 18 on the driving member 3, the clutch member 2 will rotate and drive the shaft 4 through the bolts 23, the sleeve member 6, and the key 7. The control rod 36 will, of course, normally rotate when the clutch member is engaged, since it contacts only parts that are rotating. To effect a release of the clutch member from the driving member, the operator may grasp the handle portion of the control rod and either hold the latter against rotation or move the control rod bodily away from the driving member so as to release the clutch member by pulling the same out of contact with the surface 18. If the clutch has been released by a bodily movement of the control rod, a reengagement of the clutch may be effected by merely releasing the control rod. If, however, the clutch member is released by holding the control rod against rotation while the clutch member is driven, then a reengagement of the clutch may be effected by rotating the control rod relative to the clutch member. To insure a firm reengagement of the clutch member with the driving member when rotation of the control rod is necessary, the operator may grasp the body portion of the clutch member and hold the latter away from the driving member until the control rod has been turned back a sufficient distance to permit the clutch member to be moved by the springs 29 into firm engagement with the driving member.

While the shaft 4 has been described as the driven member and the sprocket 3 as the driving member, it will be understood that a reversal of the functions of the parts could be effected without departing from the scope of my invention.

As a result of my invention there is provided an improved clutch mechanism having improved controlling means. It will be noted that the clutch mechanism is extremely compact, is easily operable, is effective for its intended purpose, and is very inexpensive to make. Other advantages of my invention will be clearly apparent to those skilled in the art.

While there is in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a clutch mechanism, in combination, a driving member and a driven member arranged in coaxial relation, clutch means for connecting said members together including a clutch member supported by said driven member for movement axially of the latter relative to said driving and driven members, means for yieldingly urging said clutch member toward said driving member, and means reacting against said driven member and having threaded engagement with said clutch member for adjusting the position of the latter relative to said driving member.

2. In a clutch mechanism, in combination, a driving member and a driven member arranged in coaxial relation, clutch means for connecting said members together including a clutch member supported by said driven member for movement axially of the latter relative to said driving and driven members, means for yieldingly urging said clutch member toward said driving member, and means including a control element arranged coaxially with said driven member for adjusting the position of said clutch member relative to said driving member, said control element adapted to react against said driven member and having threaded engagement with said clutch member.

3. In a clutch mechanism, in combination, a rotatable driving member and a rotatable driven member arranged in coaxial relation, clutch means for connecting said driven member to said driving member for rotation therewith and having a shiftable clutch operating element rotatable with and supported by said driven member for movement axially of the latter relative to said members into clutch operating and releasing positions, means for yieldingly urging said operating element axially relative to said members toward one of its positions as aforesaid, and means for adjusting the position of said clutch operating element relative to said members, said adjusting means reacting against said driven member and having threaded engagement with said operating element, said adjusting means being operative when held against rotation and said operating element is rotated relative thereto with said driven member to effect shifting of said operating element against the action of said yielding means toward its releasing position.

4. In a clutch mechanism, in combination, a rotatable driving member and a rotatable driven member arranged in coaxial relation, clutch means for connecting said driven member to said driving member for rotation therewith and having a shiftable clutch operating element rotatable with and supported by said driven member for movement axially of the latter relative to said members into clutch operating and releasing positions, means for yieldingly urging said operating element relative to said members toward one of its positions as aforesaid, and means for adjusting the position of said clutch operating element relative to said members, said adjusting means including a rotatable control element arranged coaxially with and reacting against said driven member and having threaded engagement with said operating element, said control element being operative when held against rotation and said operating element is rotated relative thereto with said driven member to effect shifting of said operating element against the action of said yielding means toward its releasing position.

5. In a clutch mechanism, in combination, a rotatable driven member and a rotatable driving member arranged in coaxial relation, clutch means for connecting said driven member to said driving member for rotation therewith and having a shiftable clutch operating element rotatable with and supported by one of said members and movable relative to said other member into clutch operating and releasing positions, and means for adjusting the position of said operating element relative to said other of said members including a rotatable control element reacting against and rotatable relative to said one of said members while their relationship axially remains constant and having threaded engagement with said operating element, said control element being operative when held against rotation and said operating element is rotated relative thereto with said element with which it rotates to effect shifting of said operating element toward one of its positions.

6. In a device of the character described, coaxial rotatable members respectively constituting driving and driven members when they are connected for rotation together, clutch means for connecting said members together and having a shiftable clutch operating element rotatable with one of said members and mounted for axial movement relative to said members into clutch operating and releasing positions, and means for adjusting said operating element to move the latter into one of its positions as aforesaid including a rotatable control element supported by and abutting one of said members, said control element being rotatable relative to said member against which it abuts without axial movement of said control element, and said control element having a connection with said operating element operable to effect upon relative rotation between said elements relative movement between said elements in a direction longitudinally of the axis of said member, said control element being operative when held against rotation and said operating element is rotated relative thereto with said member with which it rotates to effect shifting of said operating element toward one of its positions.

7. In a device of the character described, coaxial members respectively constituting driving and driven members when they are connected together, one of said members having a clutch surface formed thereon, means providing a cooperating clutch surface mounted for axial movement with respect to the other of said members and engageable with the first of said members, a control element for positioning said clutch surface providing means, said control element supported by said clutch surface providing means and having cooperating relation with said other member permitting free rotation relative thereto while their relationship axially remains constant, and said control element having a connection with the means by which it is supported operable to effect upon relative rotation therebetween a movement of said clutch surface providing means relative to said members.

8. In a device of the character described, coaxial rotatable members respectively constituting driving and driven members when they are connected for rotation together, means supporting said members for rotation in fixed planes, clutch means for connecting said members together and having shiftable operating means rotatable with one of said members and movable bodily relative thereto into clutch operating and releasing positions, means providing an abutment surface which is stationary relative to said member with which said operating means is rotatable, and means for moving said operating means toward one of its positions as aforesaid including a rotatable control element operatively engaging said abutment surface and said operating means, and said control element being rotatable without bodily movement as a whole while in engagement with said abutment surface to effect movement of said operating means toward one position, said control element being operative when held against rotation and said operating means is rotated relative thereto with said member with which is rotates to effect shifting of said operating means toward its opposite position.

9. In a clutch mechanism, in combination, a driving member and a driven member arranged in coaxial relation, clutch means for connecting said members together including a clutch member supported by said driven member for movement axially of the latter relative to said driving and driven members, means for yieldingly urging said clutch member towards said driving member, and means reacting against said driven member and having an adjustable connection with said clutch member by means of which adjustable connection it may be moved axially relative to said clutch member and effect adjustment in the position of the latter relative to said driving member.

10. In a device of the character described, coaxial rotatable members respectively constituting driving and driven members when they are connected for rotation together, clutch means for connecting said members together and having a shiftable clutch operating element mounted for rotation with one of said members and for axial movement with respect to both of said members into clutch operating and releasing positions, means for establishing a predetermined bias towards movement between said operating element and said members, and control means for adjusting said operating element into one of its positions as aforesaid including a rotatable control element supported by one of said members and in effect abutting said latter member, said control element having a connection with said operating element operable to effect upon relative rotation therebetween a movement of said operating element in opposition to said bias-establishing means, said control element being operative when held against rotation and said operating element is rotated relative thereto with said member with which it rotates to effect movement of said operating element opposite to the direction of bias of said bias-establishing means.

11. In a clutch mechanism, in combination, a rotatable driving member and a rotatable driven member arranged in coaxial relation, clutch means for connecting said driven member to said driving member for rotation together and having a shiftable clutch operating element rotatable with and supported by said driven member for movement axially of the latter relative to said members into clutch operating and releasing positions, means for yieldingly urging the operating element relative to said members toward one of its positions as aforesaid, and means for effecting adjustment of said operating element, said adjusting means reacting against said driven member and having an adjustable connection with said operating element by means of which adjustable connection said operating element may be moved axially relative to said adjusting means while the axial relationship of said adjusting means with respect to said driven member remains constant, to effect movement of said operating element relative to said driving member, said adjusting means being operative when held stationary and said operating element is rotated relative thereto with said driven member to effect shifting of said operating element against the action of said yielding means toward its releasing position.

12. In a clutch mechanism, in combination, a rotatable driven member and a rotatable driving member arranged in coaxial relation, clutch means for connecting said driven member to said driving member for rotation therewith and having a shiftable clutch operating element supported by and rotatable with one of said members and movable relative to both members into clutch operating and releasing positions, and means for adjusting the position of said operating element relative to said members including a rotatable control element reacting against and rotatable relative to said one of said members while their relationship axially remains constant and having threaded engagement with said operating element, said control element being effective when held against rotation and said operating element is rotated relative thereto with said member with which it rotates to effect shifting of said operating element toward one of its positions.

13. In a clutch mechanism, in combination, a rotatable driving member and a rotatable driven member arranged in coaxial relation, clutch means for connecting said driven member to said driving member for rotation therewith and having a shiftable operating clutch element supported by and rotatable with said driven member for movement axially of the latter relative to both members into clutch operating and releasing positions, means for yieldingly urging said operating element axially relative to said members toward its operating position, and means for adjusting the position of said operating element relative to said members including an adjusting screw reacting against said driven member and having threaded engagement with said operating element so that when said screw is held against rotation and said operating element is rotated relative thereto with said driven member said operating element is moved against the action of said yielding means toward its released position to effect release of said clutch means, and said screw being rotatable while said operating element remains stationary with said driven member to permit movement of said operating element by said yieldable means toward its operating position to effect application of said clutch means.

RALPH F. HALE.

REFERENCES CITED

The following references are of record in the file of this patent:

UNITED STATES PATENTS

| Number | Name | Date |
| --- | --- | --- |
| 271,987 | Reuleaux | Feb. 6, 1883 |
| 644,352 | Dunall | Feb. 27, 1900 |
| 780,359 | Lambert | Jan. 17, 1905 |
| 813,396 | Anker-Holth | Feb. 27, 1906 |
| 1,147,104 | Lawton | July 20, 1915 |

FOREIGN PATENTS

| Number | Country | Date |
| --- | --- | --- |
| 102,449 | Australia | Apr. 28, 1937 |

Certificate of Correction

Patent No. 2,457,367 December 28, 1948

RALPH F. HALE

It is hereby certified that errors appear in the printed specification of the above numbered patent requiring correction as follows:

Column 5, line 69, for the words "is rotates" read *it rotates*; column 8, line 19, list of references cited, for "Dunall" read *Duvall*;

and that the said Letters Patent should be read with these corrections therein that the same may conform to the record of the case in the Patent Office.

Signed and sealed this 27th day of December, A. D. 1949.

[SEAL]

THOMAS F. MURPHY,
*Assistant Commissioner of Patents.*